(12) United States Patent
Loewen et al.

(10) Patent No.: US 10,004,929 B2
(45) Date of Patent: Jun. 26, 2018

(54) PASSIVE FIRE RESPONSE SYSTEM AND METHOD OF MANUFACTURING

(71) Applicants: Eric Paul Loewen, Wilmington, NC (US); Brett Jameson Dooies, Wilmington, NC (US); Seth Ryan Paul Strege, Wilmington, NC (US); Nicholas Francis O'Neill, Wilmington, NC (US); Dana Christine Miranda, Wilmington, NC (US); Haley Michelle Cowen, Wilmington, NC (US)

(72) Inventors: Eric Paul Loewen, Wilmington, NC (US); Brett Jameson Dooies, Wilmington, NC (US); Seth Ryan Paul Strege, Wilmington, NC (US); Nicholas Francis O'Neill, Wilmington, NC (US); Dana Christine Miranda, Wilmington, NC (US); Haley Michelle Cowen, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 0 days. days.

(21) Appl. No.: 14/885,059

(22) Filed: Oct. 16, 2015

(65) Prior Publication Data

US 2017/0106220 A1 Apr. 20, 2017

(51) Int. Cl.
*A62C 3/06* (2006.01)
*A62C 35/11* (2006.01)
(Continued)

(52) U.S. Cl.
CPC .............. *A62C 3/06* (2013.01); *A62C 35/026* (2013.01); *A62C 35/11* (2013.01); *A62D 1/0028* (2013.01); *G21C 9/016* (2013.01); *G21C 9/04* (2013.01)

(58) Field of Classification Search
CPC ......... A62C 37/04; A62C 37/36; A62C 37/38; A62C 37/40; A62C 37/44; A62C 3/06;
(Continued)

(56) References Cited

U.S. PATENT DOCUMENTS 3,614,987 A * 10/1971 Bonne et al. ............ A62C 3/00
169/60
5,343,505 A 8/1994 Serviere
(Continued)

FOREIGN PATENT DOCUMENTS

EP 1300178 A1 4/2003
EP 2190487 A1 6/2010
(Continued)

OTHER PUBLICATIONS

Deukkwang An et al., "Suppression of sodium fires with liquid nitrogen." Fire Safety Journal, 58 (2013) pp. 204-207.
(Continued)

*Primary Examiner* — Christopher Kim
(74) *Attorney, Agent, or Firm* — Harness, Dickey & Pierce, P.L.C.

(57) ABSTRACT

A passive fire response system is configured to suppress a metallic fire. The system includes a reservoir containing an ionic liquid, at least one outlet in communication with the reservoir, a valve arranged between the reservoir and the outlet, a sensor configured to sense at least one of a hydrogen concentration and a temperature and/or heat, and a controller configured to open the valve and release the ionic liquid if an output from the sensor indicates that the at least one of the hydrogen concentration and the temperature equals or exceeds at least one of a threshold hydrogen concentration and a threshold temperature.

17 Claims, 4 Drawing Sheets

(51) Int. Cl.
*A62C 35/02* (2006.01)
*A62D 1/00* (2006.01)
*G21C 9/016* (2006.01)
*G21C 9/04* (2006.01)

(58) Field of Classification Search
CPC ..... A62C 35/026; A62C 35/11; A62D 1/0028;
G21C 9/016; G21C 9/04
USPC .............................................. 169/60, 61, 65
See application file for complete search history.

(56) References Cited

U.S. PATENT DOCUMENTS

| | | | | |
|---|---|---|---|---|
| 5,486,811 | A * | 1/1996 | Wehrle | G08B 17/00 169/23 |
| 6,079,502 | A * | 6/2000 | Davis | A62C 37/40 169/54 |
| 8,461,237 | B2 | 6/2013 | Miyazawa | |
| 2003/0062175 | A1* | 4/2003 | Olander | A62C 5/00 169/51 |
| 2011/0007333 | A1 | 1/2011 | Ishii et al. | |
| 2011/0039467 | A1 | 2/2011 | Xu | |
| 2011/0073331 | A1 | 3/2011 | Xu | |
| 2013/0180739 | A1 | 7/2013 | Richardson et al. | |
| 2013/0181158 | A1 | 7/2013 | Guo et al. | |
| 2013/0264509 | A1 | 10/2013 | Shalev et al. | |
| 2013/0333902 | A1 | 12/2013 | Richardson et al. | |

FOREIGN PATENT DOCUMENTS

| | | |
|---|---|---|
| JP | 60202388 A | 10/1985 |
| JP | 2644345 B2 | 8/1997 |
| JP | 2001333994 A | 12/2001 |
| WO | WO-2009/042847 A1 | 4/2009 |

OTHER PUBLICATIONS

PCT Search Report and Written Opinion issued in connection with corresponding PCT Application No. PCT/US2016/56783 dated Jan. 19, 2017.

\* cited by examiner

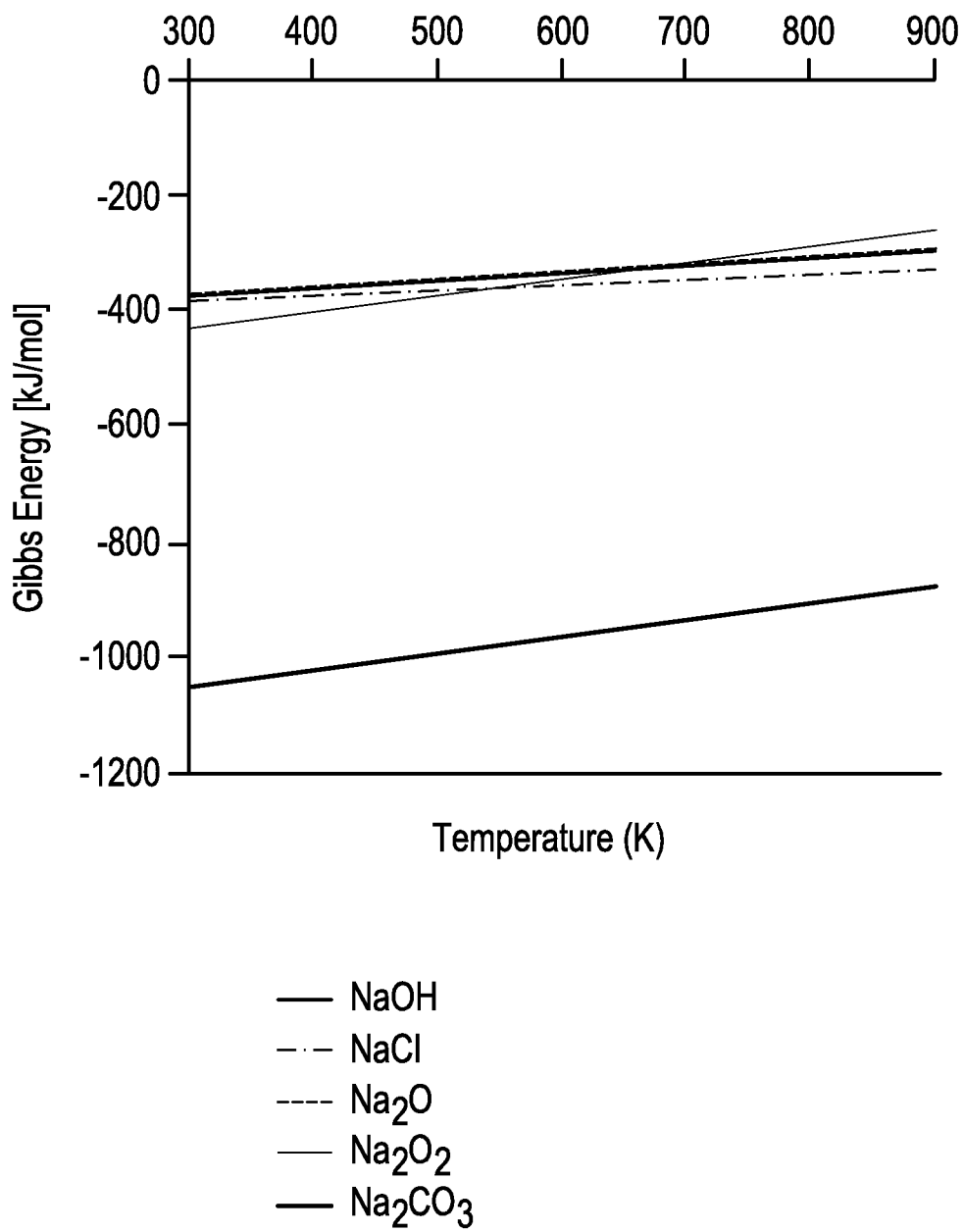

PASSIVE FIRE RESPONSE SYSTEM AND METHOD OF MANUFACTURING

FIELD

The present disclosure relates to a passive fire response system configured to release an ionic liquid.

BACKGROUND

Metal fires in a contained space are known as pool fires. A pool fire will burn at the surface where sodium is exposed to air and water. Often, a catch pan is placed in areas where metal fires are likely to occur to contain and/or mitigate interaction of the fire with structural materials.

Metal fires generate a significant amount of heat. Moreover, when sodium reacts with water, hydrogen gas is produced resulting in hydrogen detonation with oxygen.

SUMMARY

At least one example embodiment provides a passive fire response system.

In some example embodiments, a passive fire response system is configured to suppress a metallic fire. The system includes a reservoir containing an ionic liquid, at least one outlet in communication with the reservoir, a valve arranged between the reservoir and the outlet, a sensor configured to sense at least one of a hydrogen concentration and a temperature and/or heat, and a controller configured to open the valve and release the ionic liquid if an output from the sensor indicates that at least one of a threshold hydrogen concentration and a threshold temperature has been met and/or exceeded.

In at least one example embodiment, the sensor is a temperature sensor and/or a hydrogen sensor. The passive fire response system is arranged in a chamber having a ceiling, and the sensor is positioned at the ceiling.

In some example embodiments, the reservoir is located above the sensor.

In at least one example embodiment, the chamber may house a sodium fast reactor. A catch pan is positioned below the sodium fast reactor.

In some example embodiments, the controller is configured to open at least one valve when a temperature of at least about 75° C. is sensed by the sensor. In other example embodiments, the controller is configured to open at least one valve when a hydrogen concentration of at least about 50 parts per hundred million (pphm) is sensed by the sensor.

In at least one example embodiment, the passive fire response system is gravity driven. In other example embodiments, the system can further include a pump configured to pump the ionic liquid from the reservoir through the at least one outlet in response to an output from the controller.

In at least one example embodiment, the reservoir is refillable. The valve may be electronically actuated.

In at least one example embodiment, the ionic liquid is asymmetric and does not crystallize at room temperature. The ionic liquid is liquid at room temperature. The ionic liquid reacts with sodium to produce stable, non-reactive salt byproducts.

In at least one example embodiment, the passive fire response system includes a temperature control system configured to maintain the ionic liquid in the reservoir at a temperature ranging from about 10° C. to about 30° C.

In some example embodiments, a method of passively suppressing a metallic fire is provided. The method includes sensing at least one of a temperature and a hydrogen concentration in a chamber, and automatically opening a valve to release an ionic liquid from a reservoir if the sensed at least one of the temperature and the hydrogen concentration is greater than or equal to at least one of a threshold temperature and a threshold hydrogen concentration has been met and/or exceeded.

In at least one example embodiment, a method of manufacturing a passive fire response system is provided. The method includes positioning a reservoir containing an ionic liquid above a catch pan of a sodium fast reactor, establishing an outlet extending from the reservoir to the catch pan, positioning a sensor adjacent a ceiling of a chamber containing the sodium fast reactor, and connecting a control system to the sensor.

In at least one example embodiment, the sensor is configured to sense at least one of a hydrogen concentration and a temperature generated by a metallic fire. The control system is configured to release the ionic liquid from the reservoir via the outlet if an output from the sensor indicates that the at least one of the hydrogen concentration and the temperature equals or exceeds at least one of a threshold hydrogen concentration and a threshold temperature.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 4 is a graph illustrating the stability of reaction products formed in at least one example embodiment.

Corresponding reference numerals indicate corresponding parts throughout the several views of the drawings.

DETAILED DESCRIPTION

Figure 1:
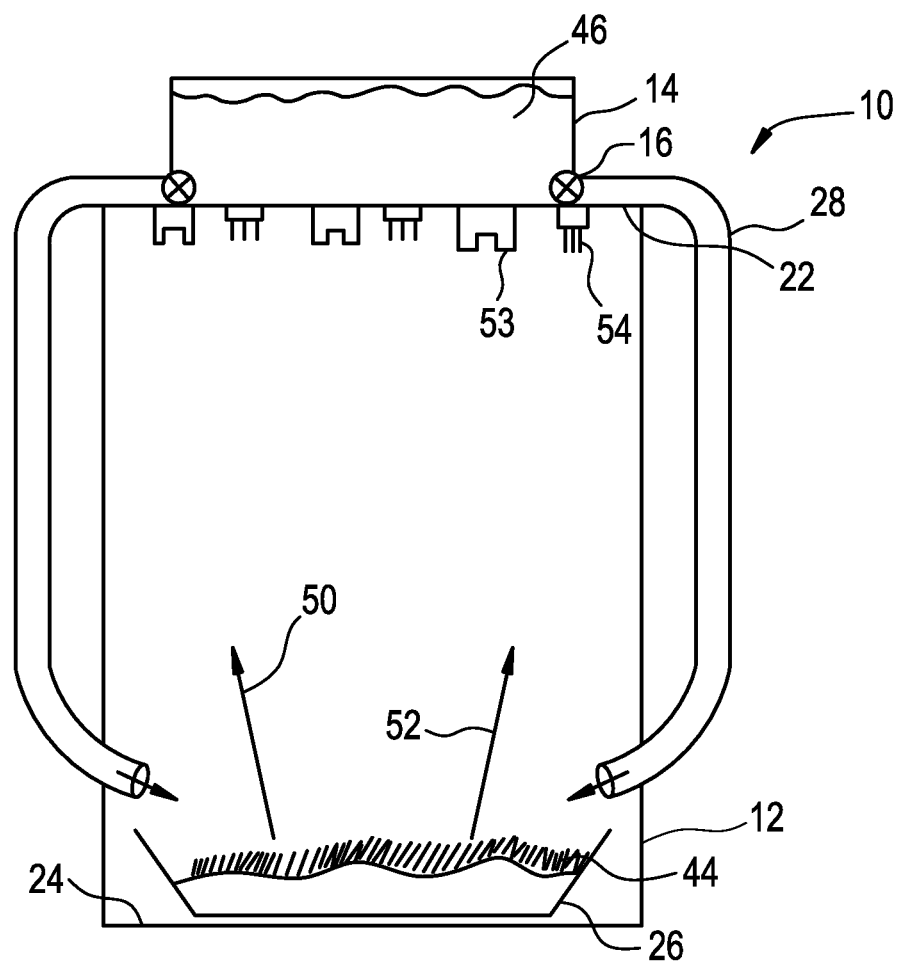
FIG. 1 is an illustration of a passive fire response system according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

In at least one example embodiment, a passive fire response system configured to suppress a metallic fire is provided.

Figure 2:
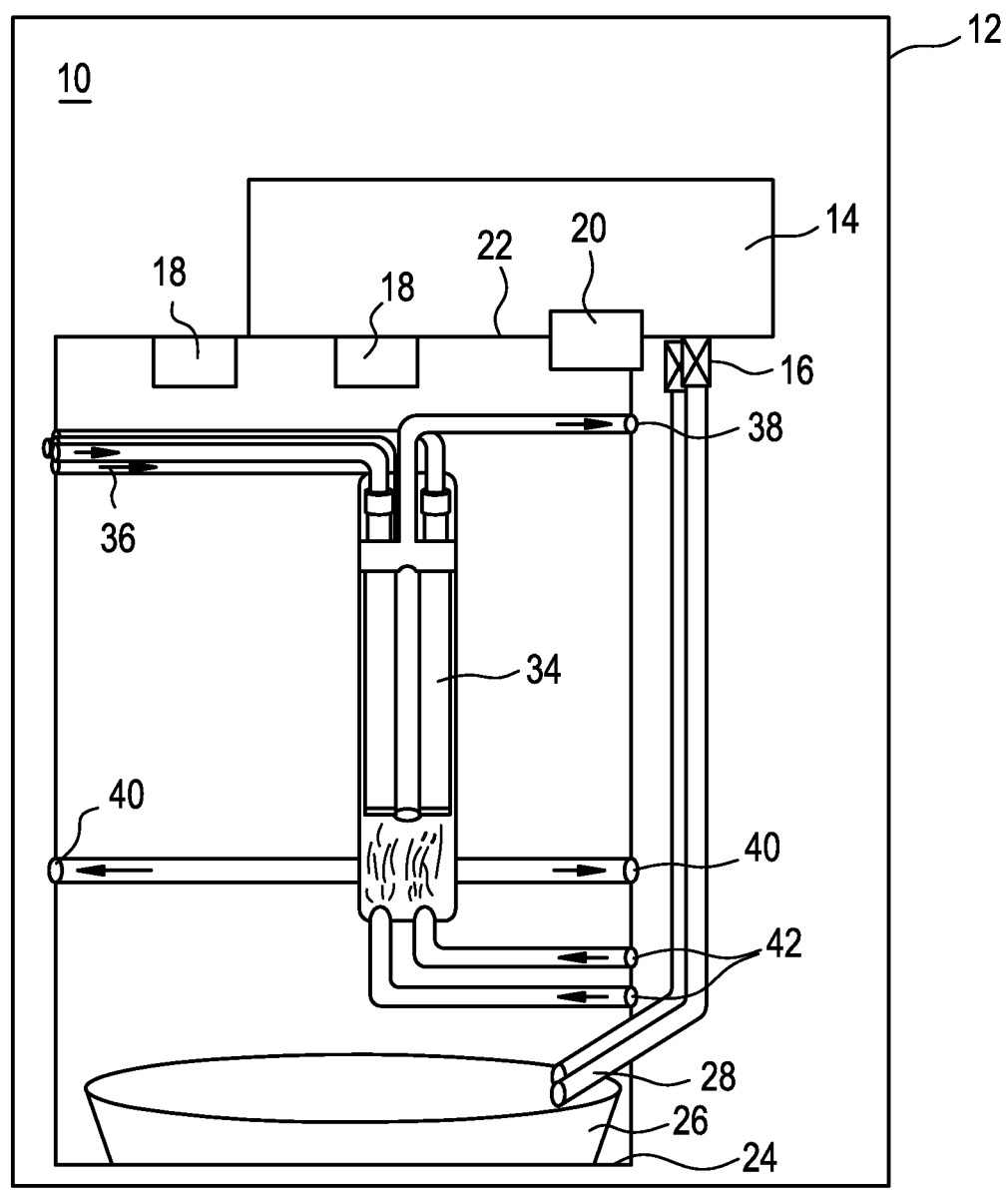
FIG. 2 is an illustration of a passive fire response system according to at least one example embodiment.
Figure 3:
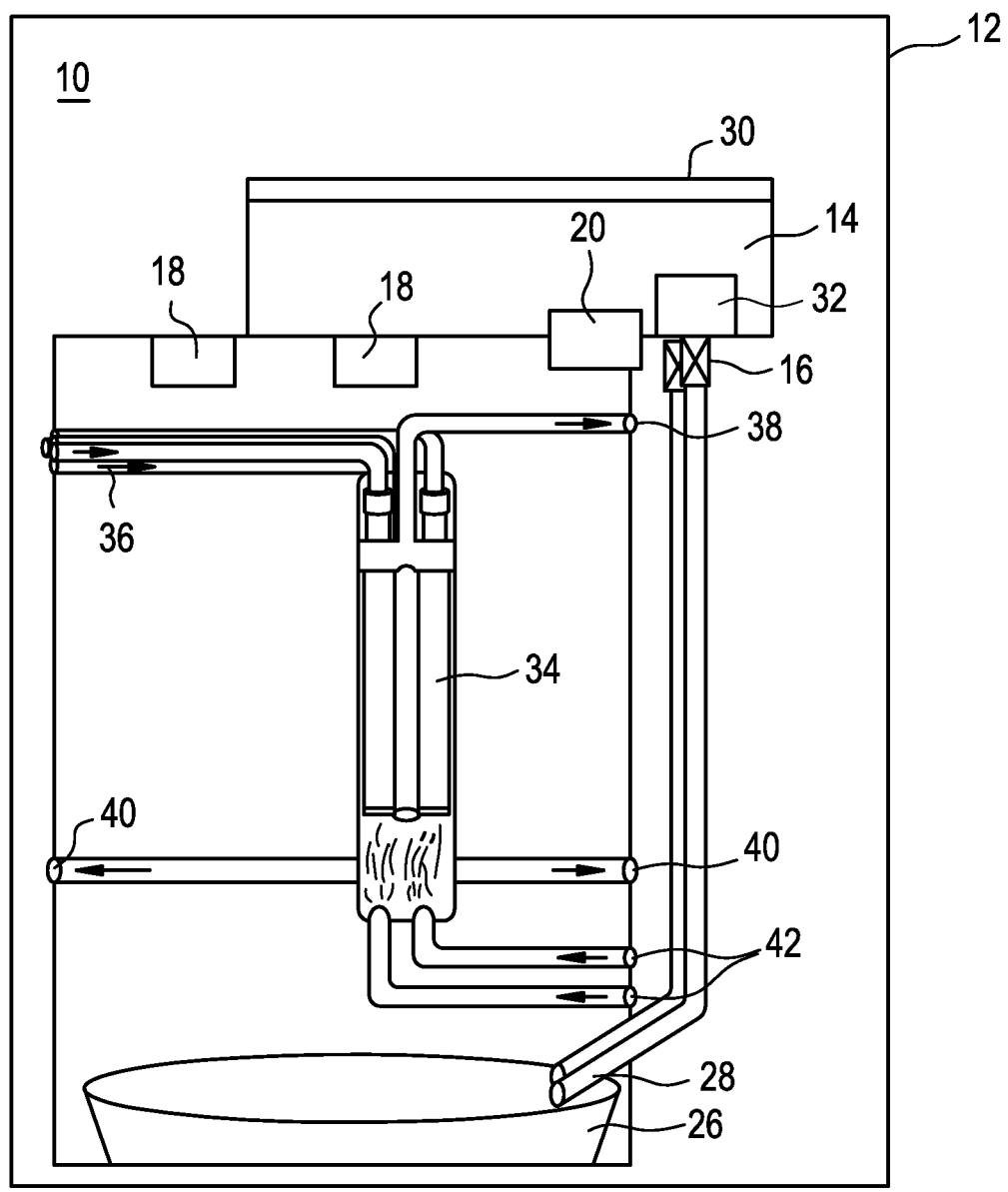
FIG. 3 is an illustration of a passive fire response system according to at least one example embodiment.

As shown in FIGS. 1-3, in some example embodiments, the passive fire response system 10 is configured to suppress a metallic fire. The passive fire response system 10 can be located in a housing 12, such as a steam generator building, of a sodium fast reactor or other type of reactor. The system 10 includes a reservoir 14, at least one outlet 28 in communication with the reservoir 14, a valve 16 arranged between the reservoir 14 and the outlet 28, and a sensor 18.

In at least one example embodiment, a catch pan 26 may be positioned on a floor 24 of the housing 12. The catch pan 26 is configured to catch sodium spilled from a reactor, such as a sodium fast reactor.

In some example embodiments, the valve 16 may be electronically actuated. If more than one outlet 28 is included in the system 10, the system may include one valve 16 for each outlet 28 or a single valve for all outlets 28.

In at least one example embodiment, the outlet 28 releases the ionic liquid 46 into and/or onto the catch pan 26 during a fire. In other example embodiments, the outlets 28 could include nozzles (not shown) that could provide targeted spraying of fire within the housing 12.

In at least one example embodiment, the reservoir 14 contains an ionic liquid 46. The reservoir 14 may be refillable and may include an inlet (not shown) through which the reservoir 14 may be refilled.

Suitable ionic liquids 46 include those set forth in U.S. Patent Application Publication No. 2011/0039467 to Xu, filed Aug. 9, 2010, the entire content of which is incorporated herein by reference thereto. In some example embodiments, the ionic liquid 46 is asymmetric and does not crystallize at room temperature. The ionic liquid 46 is liquid at room temperature.

In at least one example embodiment, the ions of the ionic liquid 46 are able to react with sodium in the housing 12 to produce environmentally stable and unreactive salt byproducts. The ionic liquids 46 can also include mixtures of certain materials that produce a liquid with an ionic character, but without water or oxygen components. For example, a corn oil and sodium bicarbonate mixture may produce a non-aqueous liquid having an ionic character, which can mitigate the spread of fire and the corrosion of components as a result of fire byproducts.

In at least one example embodiment, the sensor 18 is configured to sense at least one of a hydrogen concentration 50 and a temperature and/or heat 52 generated by a metallic fire 44. During metallic fires 44, high temperatures may be generated and hydrogen may be produced when sodium reacts with water.

Maximum temperatures and hydrogen concentrations tend to occur at localized hot areas at a ceiling 22 and/or on walls of the housing 12. Thus, in some example embodiments, the sensor 18 is positioned on the ceiling 22 of the housing 12 so that the sensor 18 will quickly sense an increase in temperature and/or hydrogen concentration.

In at least one example embodiment, the sensor 18 is a temperature sensor 54 that is configured to sense temperatures. The controller 20 receives an output from the temperature sensor, compares the output to a threshold temperature and determines whether the sensed temperature is greater than or equal to the threshold temperature. The threshold temperature is about 75° C.

In some example embodiments, the sensor 18 is a hydrogen sensor 53 that is configured to sense a hydrogen concentration. The controller 20 receives the output from the hydrogen sensor, compares the output to a threshold hydrogen concentration, and determines whether the sensed hydrogen concentration is greater than or equal to the threshold hydrogen concentration. The threshold hydrogen concentration is about 50 parts per hundred million (pphm).

Thus, the controller 20 receives an output from the sensor 18, and compares the output to at least one of the threshold temperature and threshold hydrogen concentration to determine if the thresholds have been met. If the at least one of the threshold hydrogen concentration and the threshold temperature has been met and/or exceeded, the controller 20 is configured to open the valve 16 and release the ionic liquid 46 from the reservoir 14 via the at least one outlet 28.

In at least one example embodiment, the passive fire response system 10 may include both the temperature sensor 54 and the hydrogen sensor 53. When sodium reacts with water, hydrogen is produced and rapidly diffuses. The hydrogen sensor 53 can quickly sense a change in hydrogen concentration before the temperature is greater than or equal to the threshold temperature. Once the hydrogen threshold is sensed, the controller 20 receives an output from the hydrogen sensor 53 and the controller 20 then compares the output from the hydrogen sensor 53 to the threshold hydrogen concentration. If the output from the sensor 53 exceeds the threshold hydrogen concentration, the controller 20 sends a signal to open the valve 16 and release ionic liquid 46 from the reservoir 14 via at least one outlet 28. Once the ionic liquid 46 is released, the fire may or may not be controlled depending on how large the fire has become. If the fire is not under control, the temperature will continue to rise. The temperature sensor 54 senses temperature increases. The controller 20 receives an output from the temperature sensor 54 and compares the output to the threshold temperature. If the temperature meets and/or exceeds the threshold temperature, the controller 20 sends a signal to open one or more additional valves 16 and release additional ionic liquid 46 from the reservoir 14 via at least one outlet 28. Thus, the passive fire response system 10 may be tailored to release measured amounts of ionic liquids 46 based on the outputs from the sensors 18 that are received by the controller 20.

In some example embodiments, the reservoir 14 is positioned above the sensor 18 and the release of the ionic liquid 46 from the reservoir 14 is gravity driven.

In other example embodiments, as shown in FIG. 3, the passive fire response system 10 may include a pump 32 configured to pump the ionic liquid 46 from the reservoir 14 when the valve 16 is opened by the controller 20 in response to an output received from the sensor 18 if the controller 20 compares the output to the threshold temperature and/or threshold hydrogen concentration and determines that the thresholds have been met and/or exceeded.

In at least one example embodiment, as shown in FIG. 3, the system 10 may also include a temperature control system 30 configured to maintain the ionic liquid 46 at a temperature ranging from about 10° C. to about 30° C.

As shown in FIGS. 2 and 3, the passive fire response system 10 is positioned in the housing 12 that contains a sodium fast reactor 34. The sodium fast reactor includes a sodium inlet 36, a sodium outlet 38, a steam outlet 40, and a feed water inlet 42.

By treating a metallic fire with an ionic liquid, stable, non-reactive salt byproducts are produced. The energy of formation of certain byproducts produced using this system is shown in FIG. 4. At certain temperature ranges during a metallic fire, these byproducts are more stable than the fire reaction products. For example, sodium carbonate and sodium chloride can be produced using the system 10, and these reaction products do not result in caustic corrosion that may otherwise be associated with metallic fires.

In some example embodiments, a method of passively suppressing a metallic fire is provided. The method may include sensing at least one of a temperature and a hydrogen concentration in a chamber with a sensor. The method may also include automatically opening a valve to release an ionic liquid from a reservoir if the controller determines that an output from the sensor has met and/or exceeded at least one of a threshold temperature and a threshold hydrogen concentration.

In another example embodiment, a method of manufacturing a passive fire response system is provided. The method may include positioning a reservoir containing an ionic liquid above a catch pan of a sodium fast reactor and/or other type of reactor, establishing an outlet extending from the reservoir to the catch pan, and positioning a sensor adjacent a ceiling of a chamber containing the sodium fast reactor. The sensor is configured to sense at least one of a hydrogen concentration and a temperature generated by a metallic fire. The method may also include connecting a control system to the sensor. The control system may be configured to release the ionic liquid from the reservoir via the outlet if an output from the sensor indicates that at least one of a threshold hydrogen concentration and a threshold temperature has been met and/or exceeded.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A passive fire response system configured to suppress a metallic fire, the system comprising:
    a reservoir containing a non-aqueous, ionic liquid;
    at least one outlet in communication with the reservoir;
    a valve arranged between the reservoir and the outlet;
    a sensor configured to sense at least one of a hydrogen concentration and a temperature; and
    a controller configured to open the valve and release the ionic liquid if an output from the sensor indicates that the at least one of the hydrogen concentration and the temperature equals or exceeds at least one of a threshold hydrogen concentration and a threshold temperature,
    the passive fire response system configured to be used to suppress a metallic fire, the passive fire response system at least partially arranged in a steam generator building of a sodium fast reactor,
    wherein the controller is configured to trigger a first response to the fire in response to detection of the threshold hydrogen concentration at a first time, and to trigger a second response to the fire in response to detection of the threshold temperature at a second time, the first time being earlier than the second time, the controller further configured to increase a flow of the non-aqueous, ionic liquid upon detection of the threshold temperature at the second time, such that the flow is greater at the second time than at the first time.

2. The passive fire response system of claim 1, wherein the sensor is a temperature sensor.

3. The passive fire response system of claim 1, wherein the sensor is a hydrogen sensor.

4. The passive fire response system of claim 1, wherein the reservoir is located above the sensor.

5. The passive fire response system of claim 1, wherein a catch pan is positioned below the reservoir.

6. The passive fire response system of claim 1, wherein the controller is configured to open the valve when the temperature of at least about 75° C. is sensed by the sensor.

7. The passive fire response system of claim 1, wherein the controller is configured to open the valve when the hydrogen concentration of at least about 50 parts per hundred million is sensed by the sensor.

8. The passive fire response system of claim 1, wherein the passive fire response system is gravity driven.

9. The passive fire response system of claim 1, further comprising:
a pump configured to pump the ionic liquid from the reservoir through the at least one outlet in response to an output from the controller.

10. The passive fire response system of claim 1, wherein the reservoir is refillable.

11. The passive fire response system of claim 1, wherein the valve is electronically actuated.

12. The passive fire response system of claim 1, wherein the ionic liquid is asymmetric and does not crystallize at room temperature.

13. The passive fire response system of claim 1, wherein the ionic liquid is liquid at room temperature.

14. The passive fire response system of claim 1, wherein the ionic liquid reacts with sodium to produce stable, non-reactive salt byproducts.

15. The passive fire response system of claim 1, further comprising:
a temperature control system configured to maintain the ionic liquid in the reservoir at a temperature ranging from about 10° C. to about 30° C.

16. The passive fire response system of claim 1, wherein passive fire response system is configured to provide early detection of at least one of the temperature and the hydrogen concentration and to amplify release of the ionic liquid if a larger fire is detected.

17. The passive fire response system of claim 1, wherein heat and hydrogen accumulate and provide a localized temperature increase at the sensor.

* * * * *